United States Patent [19]
Burckhardt

[11] 4,412,701
[45] Nov. 1, 1983

[54] HYDRAULIC BRAKE SYSTEM
[75] Inventor: Manfred Burckhardt, Waiblingen, Fed. Rep. of Germany
[73] Assignee: Daimler-Benz Aktiengesellschaft, Stuttgart, Fed. Rep. of Germany
[21] Appl. No.: 236,224
[22] Filed: Feb. 19, 1981
[30] Foreign Application Priority Data
  Feb. 19, 1980 [DE] Fed. Rep. of Germany ....... 3006137
[51] Int. Cl.³ ............................................. B60T 8/02
[52] U.S. Cl. .................................. 303/6 R; 180/169; 303/2; 303/13; 303/115
[58] Field of Search ............... 180/169; 303/6 R, 6 A, 303/6 C, 9, 13, 14, 15, 2, 3, 18, 91, 93, 96, 98, 100, 113, 114, 115, 117, 118, 119, 25–27, 84, 102, DIG. 2, 61; 188/345, 354, 355–360; 60/560, 563, 564, 574, 576, 593, 581

[56] References Cited
U.S. PATENT DOCUMENTS
  3,370,166  2/1968  Da Rold et al. ................. 180/169 X
  3,514,160  5/1970  Leiber .............................. 303/61 X
  3,749,451  7/1973  Edsall .............................. 188/345 X
  3,756,661  9/1973  Michellone ..................... 303/6 R X FOREIGN PATENT DOCUMENTS
  1806671  7/1970  Fed. Rep. of Germany .
  2642211  6/1978  Fed. Rep. of Germany .

Primary Examiner—Douglas C. Butler
Attorney, Agent, or Firm—Craig & Burns

[57] ABSTRACT

A hydraulic single-current or multiple-circuit brake system, preferably for a motor vehicle, which brake system includes a master brake cylinder operated by a brake pedal and individual brake circuits leading from the master brake cylinder to wheel brake cylinders. An accumulator is provided for enabling a build-up of pressure in the brake circuits when the brake pedal is not operated, with the build-up in pressure being controlled by a control unit such as a forward drive control, a distance control, or the like. A pressure modulator is installed in each of the individual brake circuits leading to the wheel brake cylinders at a position between the master brake cylinder and the wheel brake cylinder.

14 Claims, 4 Drawing Figures

HYDRAULIC BRAKE SYSTEM

The present invention relates to a brake system and, more particularly, to a hydraulic single circuit or multiple circuit brake system, preferably for a motor vehicle, which system includes a master brake cylinder, operated by a brake pedal and connected to individual brake circuits leading to wheel brake cylinders, wherein, by way of an accumulator or pressure reservoir, additional pressure, governed by a control unit, is built up with the brake not being operable, in conjunction with a forward or positive drive control, a distance control, or the like.

With a forward or positive drive control, a distance control or the like, in all of the control operations thereof, an intervention takes place into the brake system at the individual wheel brake cylinders.

The aim underlying the present invention essentially resides in ensuring a build-up of a required pressure in the brake circuit to be regulated and to separate the circuit to be regulated in a desired fashion from the master brake cylinder.

In accordance with advantageous features of the present invention, a pressure modulator is provided in each of the brake circuits leading to the wheel brake cylinders at a position between the master brake cylinder and the wheel brake cylinder.

In accordance with further features of the present invention, the pressure modulator includes a stepped housing adapted to a stepped piston, with a smaller portion of the stepped piston having two gaskets or sealing sleeves, of which only one passes over a breather port of a connection leading to the master brake cylinder. The smaller portion of the stepped piston acts on a pressure chamber to which is connected a control circuit leading to a wheel brake cylinder, with a pressure chamber of the larger portion of the stepped piston being connected to an accumulator.

Advantageously, a chamber of the large portion of the stepped piston facing away from the pressure chamber, that is, a chamber lying between the larger portion of the stepped piston and the smaller portion of the stepped piston may be relieved of pressure by means of a drain hole. The drain hole permits an unaffected movement of the stepped piston and the drainage of any relatively small amounts of leakage that may occur.

In order to effect compensation in case of a relatively low elasticity of the brake circuit to be regulated, in accordance with the present invention a "parallel volume" is provided so that a more substantial build-up of pressure will take place only after the entire gasket has moved over the breather port. For this purpose, a secondary or slave piston is provided and arranged in a cylindrical bore in an interior of the smaller portion of the stepped piston coaxially to the latter. The secondary or slave piston is displaceable against a back pressure spring, arranged in the cylinder bore, upon an actuation of the modulator under the pressure building up on the pressure chamber. The energy loss resulting from the additional volume is insignificant.

Advantageously, the back pressure spring arranged in the interior of the smaller portion of the stepped piston is dimensioned so that the pressure required for moving the secondary piston does not exceed the pressure which is just withstood by the first sleeve or gasket of the stepped piston while passing over the breather port without damaging the gasket.

By means of the two series connected gaskets, a loss of liquid is avoided which loss could arise by inadvertent actuation of the brake during a control process.

In order to enable an unimpeded movement of the secondary of slave piston, a connecting duct to an oil pressure chamber is provided in the cylinder bore in an interior of the smaller part of the stepped piston, with a large part of the stepped piston moving into the no pressure chamber. Moreover, the secondary of slave piston may have a projection which, in its outermost position, seals off the connecting duct.

As can be appreciated from the above, by virtue of the features of the present invention, it is possible to adapt a pressure level in a desired manner by virtue of the installation of a stepped piston. Additionally, the stepped piston of the pressure modulator effects a segregation of a brake circuit by passing over the breather port. Additionally, by virtue of the provision of two series-connected gaskets at the smaller part of the stepped piston, liquid losses are avoided which could occur due to an inadvertent actuation of the brake during a control procedure.

Additionally, by virtue of the present invention, with a relatively low elasticity of a circuit to be regulated, an objective is attained by the installation of the "parallel volume" that a stronger pressure build-up takes place only once the entire gasket has passed over the breather port. Additionally, an energy supply from the accumulator or pressure reservoir may take place by way of a quick acting valve such as, for example, a solenoid valve which, in some cases, already exists for different purposes.

Accordingly, it is an object of the present invention to provide a single-circuit or multiple-circuit hydraulic brake system for a motor vehicle which avoids, by simple means, shortcomings and disadvantages encountered in the prior art.

Another object of the present invention resides in providing a single-circuit or multiple-circuit hydraulic brake system which ensures a build-up of a required pressure in a regulated brake circuit.

Yet another object of the present invention resides in providing a hydraulic single-circuit or multiple-circuit brake system which enables a separation of a regulated circuit from a master brake cylinder.

A still further object of the present invention resides in providing a hydraulic single-circuit or multiple-circuit brake system wherein pressure in individual brake circuits lead to wheel brake cylinders may readily be governed by a control unit.

A still further object of the present invention resides in providing a hydraulic single-circuit or multiple-circuit brake system for a motor vehicle which minimizes if not avoids any loss of hydraulic fluid due to inadvertent actuation of the brake system.

Yet another object of the present invention resides in providing a hydraulic single-circuit or multiple-circuit brake system which enables a ready adaptation of the pressure level in the various brake circuits of the brake system.

A still further object of the present invention resides in providing a hydraulic single-circuit or multiple-circuit brake system which functions realiably under all operating conditions.

Another object of the present invention resides in providing a hydraulic single-circuit or multiple-circuit brake system which is simple in construction and therefore relatively inexpensive to manufacture.

These and other objects, features, and advantages of the present invention will become more apparent from the following description when taken in connection with the accompanying drawing which shows, for the purpose of illustration only, two embodiments in accordance with the present invention, and wherein:

FIG. 1 is a longitudinal cross sectional view through a pressure modulator for a single-circuit or multiple-circuit hydraulic brake system in accordance with the present invention; and FIG. 2 is a longitudinal cross sectional view of another embodiment of a pressure modulator for a single-circuit or multiple-circuit hydraulic brake system in accordance with the present invention equipped with a stepped piston and a secondary piston for enabling a provision of a "parallel volume".

Figure 1:
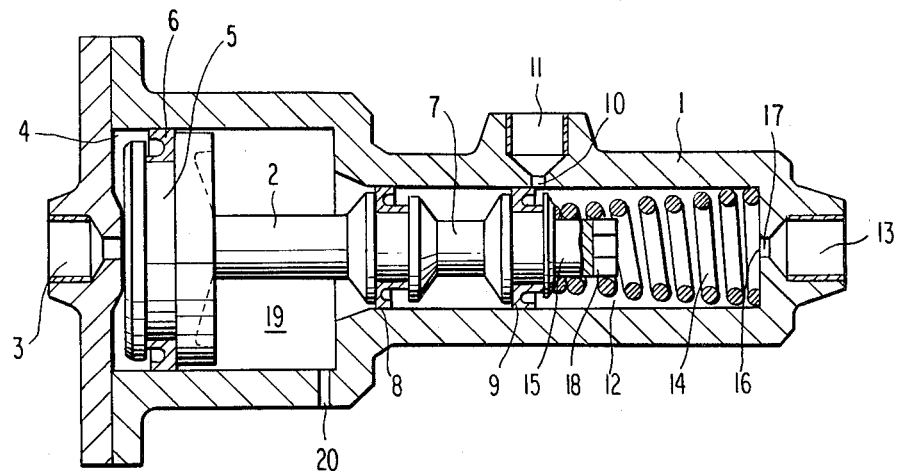
Figure 3:
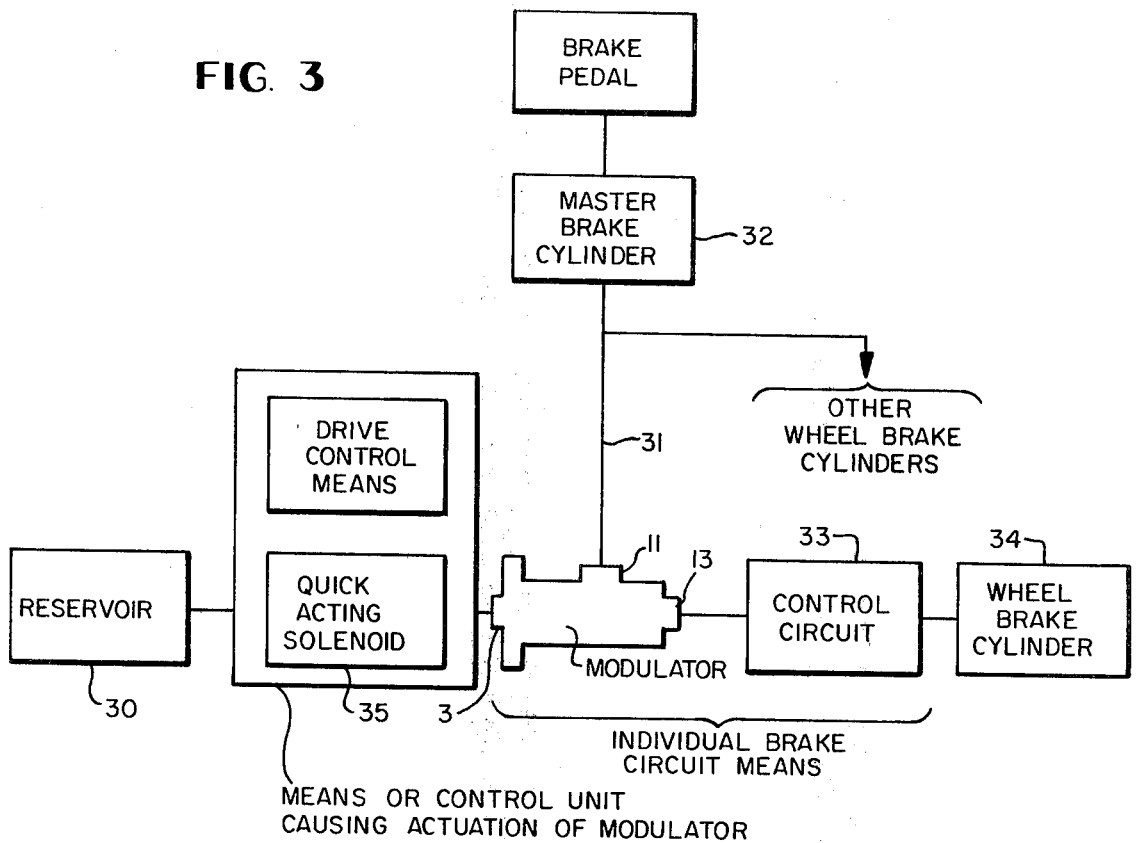
FIG. 3 is a view of a multiple-circuit hydraulic brake system in accordance with the present invention.
Figure 4:
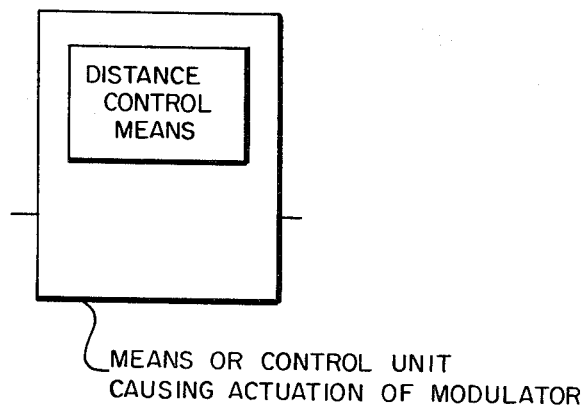
FIG. 4 is a view of a modification of the control unit of FIG. 3 showing a distance control means.

Referring now to the drawings wherein like reference numerals are used in both views to designate like parts and, more particularly, to FIG. 1, according to this Figure, a stepped housing 1 has accommodated therein corresponding stepped piston 2, with a connection 3 being provided for supplying a hydraulic pressure medium from a reservoir 30, FIG. 3, to a pressure chamber 4. The pressure chamber 4 is sealed off by a large piston part 5 of the stepped piston and a gasket or seal 6. A smaller piston part 7 of the stepped piston carries two sealing sleeves or gaskets 8, 9, with the sealing sleeve or gasket 9 being adapted to pass over a breather port 10 of a connection 11. A conduit 31, FIG. 3, leading to a master brake cylinder 32, FIG. 3, is adapted to be connected to the connection 11. The smaller piston part 7 of the stepped piston 2 acts on a pressure chamber 12 to which a control circuit 33, FIG. 3, of conventional construction, leading to a wheel brake cylinder 34, FIG. 3, is connected with a connection 13.

A helical compression spring 14 is provided for biasing or urging the stepped piston 2 back into the position shown in FIG. 1 as long as the pressure exerted by the hydraulic pressure medium supplied by the connection 3 in the pressure chamber 4 does not exceed the biasing force of the spring 14.

The smaller part 7 of the stepped piston 2 is constructed in such a manner that only the sealing device 9 but not the sealing sleeve 8 can pass over the breather port 10. The smaller piston part 7 of the stepped piston 2 is provided with a shoulder 15 having a transverse slot 18 which enables the hydraulic pressure medium, i.e., brake fluid, to continue to flow through a bore 17, communicating with the connection 13, to an associated brake cylinder wherein the shoulder 15 contacts a bottom wall 16 of the pressure chamber 12.

A chamber 19 is arranged between the larger piston part 5 and the smaller piston part 7. The larger piston part 5 of the stepped piston 2 is adapted to reciprocate in the chamber 19. The chamber 19 has a drain hole or opening 20 through which occasionally occurring leakage hydraulic fluid can be drained so that the stepped piston may move to and fro in chamber 19 unaffected by the conditions therein.

Figure 2:
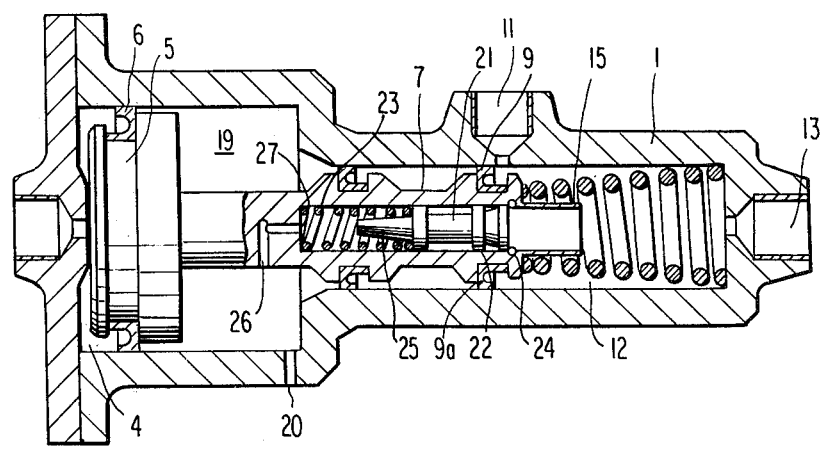

If the control circuit 33, FIG. 3, connected to the connection 13 has a very low elasticity, it is possible for the pressure gradient in the pressure chamber 12 to be so large that the pressure assumes a considerable level even before the rear of the sleeve 9 passes the breather port 10. Damage to the edge of the sleeves, which also occurs in case of master brake cylinders under similar conditions, can then be observed as a consequence of this phenomenon. In order to avoid the damaging of the sleeves under the circumstances, it is advantageous to introduce a secondary supplemental volume. For this purpose, as shown in FIG. 2, a further pressure modulator is provided wherein a secondary piston 21 with a gasket 22, a back pressure spring 23, and an abutment 24 is disposed in the smaller piston part 7. Additionally, a projection 25, attached to the secondary piston 21 on a side facing away from an abutment 24, covers, in one end position in case of a high pressure in the pressure chamber 12, a bore 26 which is vented to the outside of the pressure modulator by way of a pressureless chamber 19 and a hole or opening 20. Thus, the bore 26 is connected with a zero pressure level.

The position of the stepped pistons in FIGS. 1 and 2 represent the positions assumed when the pressure modulator is in a rest condition. If the pressure modulator is actuated by a supplying of a hydraulic pressure medium through the connection 3 into the pressure chamber by way of, for example, a quick acting solenoid valve 35, FIG. 3, then the gasket or sleeve 9 first seals off the breather port 10 and a pressure build-up begins in the pressure chamber 12. In the pressure modulator of FIG. 1, the continued supplying of pressure medium into the pressure chamber 4 results in the stepped piston 2 being further displaced against the biasing force of the compression spring 14 until the gasket or sleeve 9 opens the breather port 10 to the space between the gasket or sleeves 8, 9 thereby separating the master brake cylinder from the brake circuit connected to the wheel brake cylinder to be regulated. The pressure built up in the pressure chamber 12 acts on the brake circuit by way of the bore 17 and connection 13.

In the pressure modulator construction of FIG. 2, the pressure build-up in the pressure chamber 12 urges the secondary piston 21 against the biasing force of the back pressure spring 23. The volumes are dimensioned so that the secondary piston 21 abuts with the projection 25 against the bottom 27 of the bore in the piston 7 precisely when a rear edge 9a of the sleeve 9 has just completely passed the breather port 10. The back pressure spring 23 is dimensioned so that pressure required for moving the secondary piston 21 does not exceed a tolerable pressure level which may be exerted on the sleeve 9 without damage as the sleeve 9 passes over the breather port 10. The energy loss resulting from the additional "parallel volume" is minor and thus negligible.

While I have shown and described only two embodiments in accordance with the present invention, it is understood that the same is not limited thereto but is susceptible of numerous changes and modifications as known to one having ordinary skill in the art and I therefore do not wish to be limited to the details shown and described herein but intend to cover all such modifications as are encompassed by the scope of the appended claims.

I claim:

1. A hydraulic brake system having at least a single circuit for a motor vehicle, the brake system including a brake pedal means, a master brake cylinder means, a plurality of wheel brake cylinders, and individual brake circuit means for connecting the master brake cylinder means with the respective wheel brake cylinders, a pressure modulator means disposed in each of the individual brake circuit means between the master brake cylinder means and the respective wheel brake cylinders, wherein means are provided for causing an actuation of the pressure modulator means so as to enable a building up of a pressure in the individual brake circuit means when the brake system is not operated by the brake pedal means, and characterized in that the pressure modulator means includes a stepped housing means, a stepped piston adapted to the housing means is displaceably mounted in the housing means, the stepped piston includes a large piston portion and a small piston portion, a pair of axially spaced sealing means are disposed on the small piston portion, means are provided for connecting the housing means with the master brake cylinder means, one of said sealing means is adapted to selectively open and close the means for connecting the housing means with the master brake cylinder means, a first pressure chamber means is provided in the housing and is cooperable with the large piston portion, a second pressure chamber means is provided in the housing means for the small piston portion, means are provided for connecting the second pressure chamber to the individual brake circuit means, and in that means are provided for connecting the first pressure chamber means with the means for causing an actuation of the pressure modulator means.

2. A hydraulic brake system having at least a single circuit for a motor vehicle, the brake system including a brake pedal means, a master brake cylinder means, a plurality of wheel brake cylinders, and individual brake circuit means for connecting the master brake cylinder means with the respective wheel brake cylinders, characterized by a pressure modulator means disposed in each of the individual brake circuit means between the master brake cylinder means and the respective wheel brake cylinders, wherein means are provided for causing an actuation of the pressure modulator means so as to enable a building up of a pressure in the individual brake circuit means when the brake system is not operated by the brake pedal means, and the means for causing an actuation of the pressure modulator means includes a control unit, and characterized in that the pressure modulator means includes a stepped housing means, a stepped piston adapted to the housing means is displaceably mounted in the housing means, the stepped piston includes a large piston portion and a small piston portion, a pair of axially spaced sealing means are disposed on the small piston portion, means are provided for connecting the housing means with the master brake cylinder means, one of said sealing means is adapted to selectively open and close the means for connecting the housing means with the master brake cylinder means, a first pressure chamber means is provided in the housing and is cooperable with the large piston portion, a second pressure chamber means is provided in the housing means for the small piston portion, means are provided for connecting the second pressure chamber to the individual brake circuit means, and in that means are provided for connecting the first pressure chamber means with the means for causing an actuation of the pressure modulator means.

3. A hydraulic brake system having at least a single circuit for a motor vehicle, the brake system including a brake pedal means, a master brake cylinder means, a plurality of wheel brake cylinders, and individual brake circuit means for connecting the master brake cylinder means with the respective wheel brake cylinders, a pressure modulator means disposed in each of the individual brake circuit means between the master brake cylinder means and the respective wheel brake cylinders, wherein means are provided for causing an actuation of the pressure modulator means so as to enable a building up of a pressure in the individual brake circuit means when the brake system is not operated by the brake pedal means, the means for causing an actuation of the pressure modulator means includes a control unit, and the control unit is at least one of a drive control means and a distance control means of the motor vehicle, and characterized in that the pressure modulator means includes a stepped housing means, a stepped piston adapted to the housing means is displaceably mounted in the housing means, the stepped piston includes a large piston portion and a small piston portion, a pair of axially spaced sealing means are disposed on the small piston portion, means are provided for connecting the housing means with the master brake cylinder means, one of said sealing means is adapted to selectively open and close the means for connecting the housing means with the master brake cylinder means, a first pressure chamber means is provided in the housing and is cooperable with the large piston portion, a second pressure chamber means is provided in the housing means for the small piston portion, means are provided for connecting the second pressure chamber to the individual brake circuit means, and in that means are provided for connecting the first pressure chamber means with the means for causing an actuation of the pressure modulator means.

4. A hydraulic brake system having at least one individual brake circuit and a pressure modulator means comprising
    stepped housing means,
    a stepped piston adapted to the housing means is displaceably mounted in the housing means, the stepped piston includes a large piston portion and a small piston portion, a pair of axially spaced sealing means are disposed on the small piston portion,
    means are provided for connecting the housing means with a master brake cylinder means,
    one of the said sealing means is adapted to selectively open and close the means for connecting the housing means with the master brake cylinder means,
    a first pressure chamber means is provided in the housing and is cooperable with the large piston portion,
    a second pressure chamber means is provided in the housing means for the small piston portion,
    means are provided for connecting the second pressure chamber to the individual brake circuit means, and in that
    means are provided for connecting the first pressure chamber means with a means for causing an actuation of the pressure modulator means.

5. A hydraulic system according to one of claims 1, 2, 3 and 4, characterized in that
    a further chamber means is provided in the housing means between the large piston portion and the small piston portion, and in that
    means are provided for rendering the further chamber means pressureless so as to enable a drain of any leaking hydraulic pressure medium.

6. A hydraulic brake system according to claim 5, characterized in that the means for causing an actuation of the pressure modulator means further includes a hydraulic pressure medium accumulator.

7. A hydraulic brake system according to one of claims 1, 2, 3 and 4 characterized in that
the smaller piston portion includes a internal cylindrical bore opening into the second pressure chamber means,
a secondary piston is arranged in the cylindrical bore coaxial with the stepped piston, the secondary piston is displaceable by a pressure occurring in the second pressure chamber means upon actuation of the pressure modulator means.

8. A hydraulic brake system according to claim 7, characterized in that spring means are disposed in the cylindrical bore for urging the secondary piston in a direction of the second pressure chamber means.

9. A hydraulic brake system according to claim 8, characterized in that the spring means has a biasing force such that a pressure required for displacing the secondary piston does not exceed a maximum pressure to which the sealing means opening and closing the connecting means may be subjected without the sealing means being damaged.

10. A hydraulic brake system according to claim 9, characterized in that means are provided for venting the cylindrical bore.

11. A hydraulic brake system according to claim 10, characterized in that a further chamber means is provided in the housing means between the large piston portion and the small piston portion, and in that means are provided for rendering the further chamber means pressureless so as to enable a drain of any leaking hydraulic pressure medium.

12. A hydraulic brake system according to claim 11, characterized in that the venting means includes a connecting duct extending between the further chamber means and the cylindrical bore.

13. A hydraulic brake system according to claim 12, characterized in that means are provided on the secondary piston for selectively sealing off the connecting dirt.

14. A hydraulic brake system according to claim 13, characterized in that the means for causing an actuation of the pressure modulator means further includes a hydraulic pressure medium accumulator.

* * * * *